(12) United States Patent
Dazé et al.

(10) Patent No.: US 11,573,678 B2
(45) Date of Patent: Feb. 7, 2023

(54) CONTENT SHARING SYSTEM AND METHOD

(71) Applicant: Faraday & Future Inc., Gardena, CA (US)

(72) Inventors: Nicholas William Dazé, Los Angeles, CA (US); Claude P. Meyers, Pasadena, CA (US); Jennifer Anne Lin, Los Angeles, CA (US); Matthew Joseph Coburn, Redondo Beach, CA (US)

(73) Assignee: Faraday & Future Inc., Gardena, CA (US)

( * ) Notice: Subject to any disclaimer, the term of this patent is extended or adjusted under 35 U.S.C. 154(b) by 289 days.

(21) Appl. No.: 15/275,573

(22) Filed: Sep. 26, 2016

(65) Prior Publication Data

US 2018/0088777 A1    Mar. 29, 2018

(51) Int. Cl.
| | |
|---|---|
| G06F 3/04817 | (2022.01) |
| H04L 65/403 | (2022.01) |
| G06F 3/0486 | (2013.01) |
| G06F 3/0482 | (2013.01) |
| G06F 3/0488 | (2022.01) |
| H04L 67/125 | (2022.01) |
| H04L 65/60 | (2022.01) |
| H04L 67/06 | (2022.01) |

(52) U.S. Cl.
CPC ........ *G06F 3/04817* (2013.01); *G06F 3/0482* (2013.01); *G06F 3/0486* (2013.01); *G06F 3/0488* (2013.01); *H04L 65/403* (2013.01); *H04L 65/60* (2013.01); *H04L 67/06* (2013.01); *H04L 67/125* (2013.01)

(58) Field of Classification Search
CPC .................................................... G06F 3/04817
USPC ......................................................... 715/716
See application file for complete search history.

(56) References Cited

U.S. PATENT DOCUMENTS

| | | | |
|---|---|---|---|
| 8,483,396 B2* | 7/2013 | Amadu | H04R 5/02 381/1 |
| 2003/0160825 A1* | 8/2003 | Weber | G06F 3/0486 715/769 |
| 2005/0055639 A1* | 3/2005 | Fogg | G06Q 10/10 715/262 |
| 2005/0075759 A1* | 4/2005 | Furuta | G11B 27/034 701/1 |
| 2010/0251177 A1* | 9/2010 | Geppert | G06F 3/04817 715/821 |
| 2011/0239117 A1* | 9/2011 | Sutton | G06F 3/0486 715/706 |

(Continued)

*Primary Examiner* — Sherief Badawi
*Assistant Examiner* — Conrad R Pack
(74) *Attorney, Agent, or Firm* — Veros Legal Solutions, LLP

(57) ABSTRACT

A content sharing system and method are disclosed. According to certain embodiments, the system may be used in a vehicle. The system may include a user interface and a controller coupled with the user interface. The controller may be configured to display a map of the vehicle on the user interface. The map may show at least a plurality of user devices in the vehicle, and an icon representing content presented by a first user device. The controller may also be configured to detect a user operation moving the icon on the user interface. The controller may further be configured to control, based on the user operation, sharing of the content between the first user device and at least a second user device.

18 Claims, 8 Drawing Sheets

(56) References Cited

U.S. PATENT DOCUMENTS

| | | | | |
|---|---|---|---|---|
| 2011/0270492 A1* | 11/2011 | Hwang | ............ | B60R 21/01516 |
| | | | | 701/45 |
| 2012/0053793 A1* | 3/2012 | Sala | ............ | B60N 2/002 |
| | | | | 701/45 |
| 2012/0159472 A1* | 6/2012 | Hong | ............ | H04W 4/21 |
| | | | | 717/178 |
| 2012/0260288 A1* | 10/2012 | Fujiki | ............ | H04L 51/08 |
| | | | | 725/39 |
| 2013/0145325 A1* | 6/2013 | Ording | ............ | G06F 3/0486 |
| | | | | 715/846 |
| 2014/0309871 A1* | 10/2014 | Ricci | ............ | G06Q 50/30 |
| | | | | 701/36 |
| 2014/0335497 A1* | 11/2014 | Gal | ............ | G09B 5/08 |
| | | | | 434/323 |
| 2015/0015479 A1* | 1/2015 | Cho | ............ | G06F 3/013 |
| | | | | 345/156 |
| 2015/0086035 A1* | 3/2015 | Shin | ............ | H04R 1/02 |
| | | | | 381/86 |
| 2015/0149585 A1* | 5/2015 | Zhang | ............ | H04L 51/14 |
| | | | | 709/217 |
| 2015/0156274 A1* | 6/2015 | Alten | ............ | G06F 16/24537 |
| | | | | 709/204 |
| 2015/0271561 A1* | 9/2015 | Park | ............ | H04N 21/41422 |
| | | | | 725/59 |
| 2016/0088086 A1* | 3/2016 | Cuddihy | ............ | H04W 4/80 |
| | | | | 455/41.2 |
| 2016/0134942 A1* | 5/2016 | Lo | ............ | H04N 21/4825 |
| | | | | 725/51 |
| 2017/0019525 A1* | 1/2017 | Hannon | ............ | G01S 5/18 |

* cited by examiner

CONTENT SHARING SYSTEM AND METHOD

TECHNICAL FIELD

The present disclosure relates generally to a content sharing system and method, and more particularly, to a method and system for controlling the sharing of content among multiple user devices in a vehicle based on user operations performed on a user interface.

BACKGROUND

In-vehicle infotainment (IVI) systems are used to provide multimedia information and connectivity. For example, watching and listening to media content make traveling pleasant for vehicle occupants. As another example, passengers of a vehicle may need to conduct video/audio calls or browse the Internet during the trip. An IVI system may provide multiple user devices, such as displays and speakers, for presenting media content. Each vehicle occupant may use their own user device to view or listen to different media content.

The occupants may often want to share the media content played on their user devices. For example, an occupant may find the movie watched by another occupant interesting, and like to watch the movie, too. For another example, an occupant hosting a video teleconference may want to invite another occupant into the call. In these situations, it may be difficult and inconvenient for the occupants to share one user device, because of the limitations of screen size and seating position (e.g., a front passenger and a rear passenger). Therefore, it is desirable to develop a system for vehicle occupants to seamlessly share media content among multiple user devices.

The disclosed system is directed to mitigating or overcoming one or more of the problems set forth above and/or other problems in the prior art.

SUMMARY

One aspect of the present disclosure is directed to a content sharing system for use in a vehicle. The system may include a user interface and a controller coupled with the user interface. The controller may be configured to display a map of the vehicle on the user interface. The map may show at least a plurality of user devices in the vehicle, and an icon representing content presented by a first user device. The controller may also be configured to detect a user operation moving the icon on the user interface. The controller may further be configured to control, based on the user operation, sharing of the content between the first user device and at least a second user device Another aspect of the present disclosure is directed to a content sharing method for use in a vehicle. The method may include displaying a map of the vehicle on a user interface. The map may show at least a plurality of user devices in the vehicle, and an icon representing content presented by a first user device. The method may also include detecting a user operation moving the icon on the user interface. The method may further include controlling, based on the user operation, sharing of the content between the first user device and at least a second user device.

Yet another aspect of the present disclosure is directed to a non-transitory computer-readable medium storing instructions which, when executed, cause one or more processors to perform a content sharing method for use in a vehicle. The method may include displaying a map of the vehicle on a user interface. The map may show at least a plurality of user devices in the vehicle, and an icon representing content presented by a first user device. The method may also include detecting a user operation moving the icon on the user interface. The method may further include controlling, based on the user operation, sharing of the content between the first user device and at least a second user device.

DETAILED DESCRIPTION

This disclosure is generally directed to a system and method that control the sharing of content among multiple user devices and users of the user devices. The term "content" in this disclosure is used to mean any information or data that can be consumed, i.e., viewed, listened to, and/or sensed, by people. The content may be presented by a user device in any suitable forms, such as audios, texts, images, animations, videos, interactive content, webpages, maps, or a combination thereof.

In some embodiments, the disclosed system may include a user interface configured to display a map showing information regarding the user devices and content presented by one or more of the user devices. A user may operate the user interface to seamlessly share content presented by a user device with another user device.

The principles of the present disclosure are described in connection with the exemplary vehicle depicted in FIG. 1. As described below, the disclosed system and method may be implemented to facilitate sharing of content among multiple occupants of the vehicle. However, those skilled in the art will recognize that the principles of the present disclosure may be applied to a content sharing system and method used in any types of structures or machines.

Figure 1:
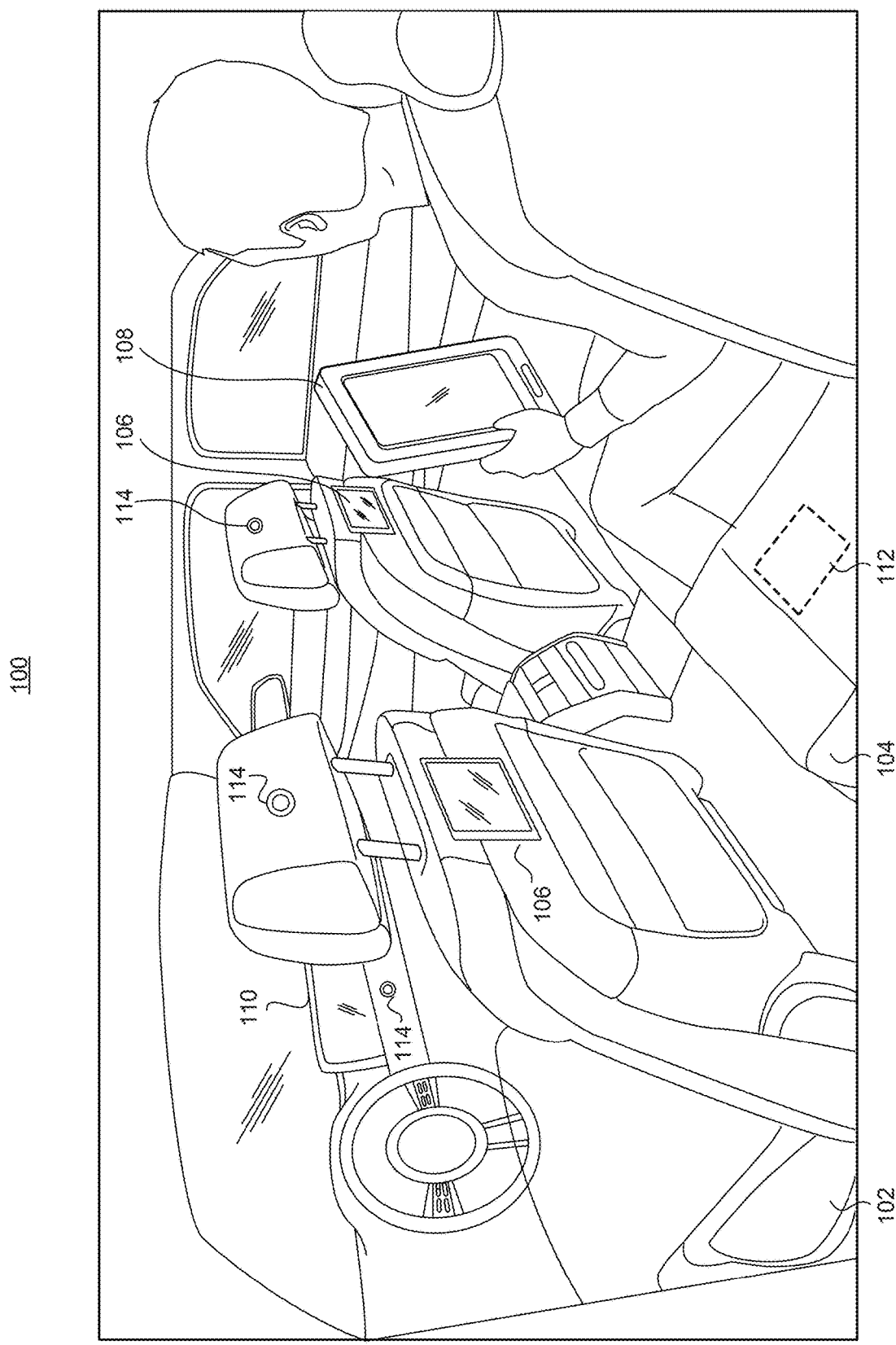
FIG. 1 is a schematic illustration of an exemplary vehicle interior including an exemplary in-vehicle content sharing system.

FIG. 1 is a schematic diagram illustrating a partial interior view of an exemplary vehicle 100. Vehicle 100 may have any body style, such as a sports car, a coupe, a sedan, a pick-up truck, a station wagon, a sports utility vehicle (SUV), a minivan, a conversion van, a bus, or a commercial truck. Vehicle 100 may be an electric vehicle, a fuel cell vehicle, a hybrid vehicle, or a conventional internal combustion engine vehicle. Vehicle 100 may be configured to be operated by a driver occupying vehicle 100, to be remotely controlled, and/or to be autonomously controlled.

Referring to FIG. 1, vehicle 100 may include one or more front seats 102 and back seats 104. Seats 102, 104 may be arranged in any number of rows. For example, back seats 104 may be in a second row of a sedan, or in a second and/or a third row of a minivan or an SUV.

Various types of user devices may be used in vehicle 100 to present visual content, audio content, or any other types of data or information to occupants of vehicle 100. For example, the video content may include video calls, video podcasts, television (TV) shows, Internet videos, advertisements, and/or movies. The audio content may include audio calls, audio podcasts, audio books, radio, advertisements, and/or music. Other data or information may include emails, text messages, chat messages, navigation map and data, vehicle status data, webpages, e-books, and/or pictures. Each user device in vehicle 100 may present different content or the same content.

With continued reference to FIG. 1, the user devices may include one or more display panels 106 positioned for viewing from seats 102 and/or 104. Display panels 106 may be installed in different locations and in different manners. For example, display panels 106 may also be attached to the back of each front seat 102 for use by passengers sitting on back seats 104. Display panels 106 may also be placed above the glove box for use by passenger(s) sitting on front passenger seat 102. Moreover, display panels 106 may be coupled to the ceiling of vehicle 100, which, when unused, may be folded into the ceiling.

Display panels 106 may be configured to output images, maps, webpages, videos, and/or other types of visual content to the occupants. For example, display panels 106 may be configured to display visual representations of content data retrieved from a database, and may arrange the content data in playlists. Display panels 106 may include an LCD, an LED, a plasma display, or any other type of display. Display panels 106 may have one or more associated or embedded speakers (not shown) for broadcasting audio content with the images or videos. Alternatively, the speakers may be separate modules located elsewhere, for example, on the doors of vehicle 100. Display panels 106 may also include an audio port for connection by a headphone. Display panels 106 may be configured to display any type of visual information, such as video conferences, movies, television shows, or webpages.

Still referring to FIG. 1, the user devices may also include one or more mobile terminals 108 associated with occupants of vehicle 100. Mobile terminals 108 may include a number of different structures. For example, mobile terminals 108 may include a smart phone, a tablet, a personal computer, a wearable device, such as a smart watch or Google Glass™, and/or complimentary components. Mobile terminals 108 may be configured to connect to a network, such as a nationwide cellular network, a local wireless network (e.g., Bluetooth™ or WiFi), and/or a wired network. Mobile terminals 108 may also be configured to access apps and websites of third parties, such as iTunes™, Pandora™, YouTube™, Google Voice™, and Skype™.

In some embodiments, mobile terminals 108 may be programmed to be associated with the occupants of vehicle 100. For example, vehicle 100 may be configured to determine the presence of a specific occupant based on a digital signature from mobile terminals 108. For instance, a controller may be configured to relate the digital signature to stored data including the occupant's name and the occupant's relationship with vehicle 100. The digital signature of mobile terminals 108 may include a determinative emitted radio frequency (RF) or a GPS tag. Mobile terminals 108 may be configured to automatically connect to vehicle 100 through a local network in vehicle 100, e.g., Bluetooth™ or WiFi, when positioned within a proximity to vehicle 100.

In the disclosed embodiments, display panels 106 and mobile terminals 108 may function as independent user devices. Alternatively or additionally, mobile terminals 108 may be paired with display panels 106 and serve as input devices for the respective display panels 106. For example, mobile terminals 108 may be configured to receive occupant input for controlling one or more of display panels 106. Mobile terminals 108 may allow the occupants to access their user accounts associated with vehicle 100 to retrieve their saved settings on display panels 106, such as the playlist of video clips, browsing history of websites, etc.

In exemplary embodiments, one or more user interfaces may be used by occupants of vehicle 100 to control the sharing of content among the user devices. The user interfaces may be implemented as an integral part of display panels 106 and/or mobile terminals 108. For example, the user interfaces may be configured as the input and output interfaces of display panels 106 and mobile terminals 108. Alternatively, the user interface may be devices independent from display panels 106 and mobile terminals 108. For example, referring to FIG. 1, the user interfaces may include a control panel 110 located at the dashboard of vehicle 100. Control panel 110 may be configured to allow a user to control the sharing of content among the user devices and other functions of vehicle 100. Control panel 110 may include a separate controller configured to process data and/or may be used in conjunction with an on-board computer configured to perform other functions of vehicle 100.

The disclosed user interfaces may be configured to receive input from users and transmit data. For example, a user interface may have a display including an LCD, an LED, a plasma display, or any other type of display, and provide a graphical user interface (GUI) presented on the display for user input and data display. The user interface may further include input devices, such as a touchscreen, a keyboard, a mouse, and/or a tracker ball. The user interface may be configured to provide Internet access, cell phone access, and/or in-vehicle network access, such as Bluetooth™, CAN bus, or any other vehicle bus architecture protocol that may be used to access features or settings within vehicle 100. Similar to the user devices, the user interface may also be configured to present a variety of content, such as video/audio calls, movies, music, etc.

The user interface may be configured to receive user-defined settings. For example, the user interface may be configured to receive occupant profiles including individual preferences, for example, over the playing and sharing of content. In some embodiments, the user interface may include a touch-sensitive surface that may be configured to receive biometric data (e.g., detect a fingerprint of an occupant). The touch-sensitive surface may be configured to detect the ridges and furrows of a fingerprint based on a change in capacitance and generate a signal based on the detected fingerprint, which may be processed by a controller. The controller may be configured to compare the signal to stored data to determine whether the fingerprint matches any of recognized occupants. The user interface may be configured to convert the biometric data into a signal, such that the controller may be configured to identify the person who is generating an input. Furthermore, the user interface may be configured to store data history accessed by the identified people.

Still referring to FIG. 1, vehicle 100 may also include various sensors, such as pressure sensors 112 and cameras 114, to detect the seating positions, identities, and activities of the occupants. Pressure sensors 112 may be positioned in a seat base of each seat 102, 104. Pressure sensors 112 may include any structure configured to generate a signal based on a pressure placed on seats 102, 104. For example, pressure sensors 112 may employ a strain gauge sensor configured to determine a change in resistance based on pressure applied to the sensor. As depicted by the dash lines in FIG. 1, pressure sensors 112 may be embedded within the interior of seats 102, 104. For example, pressure sensors 112 may be incorporated into a support of seats 102, 104. The signals generated by pressure sensors 112 may indicate which seats 102, 104 are occupied and thus the seating positions of corresponding occupants.

Cameras 114 may include any device configured to capture videos and/or images of the interior of vehicle 100 and generate a signal to be processed to detect the presence of occupants of vehicle 100. For example, cameras 114 may be used in conjunction with computer vision and/or image recognition software, such that the software may distinguish a person from inanimate objects, and may determine an identity of certain people based on physical appearances. In some embodiments, the image recognition software may include facial recognition software and may be configured to recognize facial features and determine the age (e.g., by determining size and facial features) of occupants based on the videos or the images. Cameras 114 may be configured to be adjusted by a motor (not shown) to improve a video or an image of the occupant. For example, the motor may be configured to tilt camera 114 in a horizontal and/or vertical plane to substantially center the occupant(s) in the frame. The motor may also be configured to adjust the focal point of cameras 114 to substantially focus on the facial features of the occupants.

Cameras 114 may be in a number of positions and at different angles to capture video or images of the driver and/or other occupants. For example, a camera 114 may be located on the dashboard to capture an image of facial features of an occupant sitting in front seats 102, as depicted in FIG. 1. Cameras 114 may additionally be located in positions, e.g., the back of each front seat 102, to capture facial features of occupants sitting in back seats 104. In some embodiments, vehicle 100 may, additionally or alternatively, include a dome camera positioned on the ceiling and configured to capture a substantially 360° image of the interior of vehicle 100.

Figure 2:
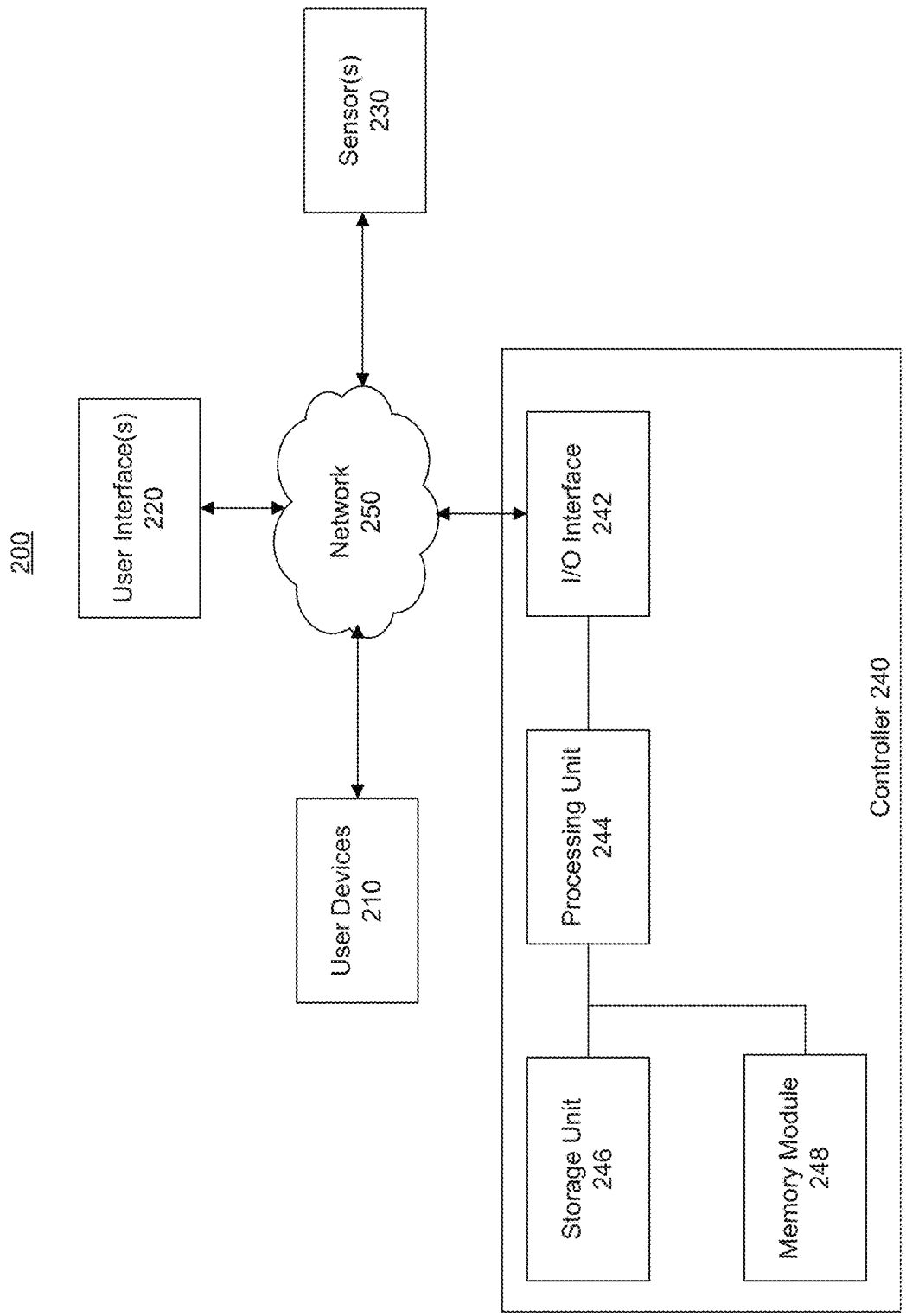
FIG. 2 is a block diagram of an exemplary in-vehicle content sharing system.

FIG. 2 provides a block diagram of an exemplary in-vehicle content sharing system 200 that may be used to share content among multiple user devices in vehicle 100. As illustrated in FIG. 2, system 200 may include a plurality of user devices 210, one or more user interface 220, one or more sensors 230, a controller 240, and a network 250.

User devices 210, e.g., user devices 210-1, 220-2, . . . , and 210-N, may be configured to present different or the same content to the occupants of vehicle 100. For example, user devices 210 may include one or more display panels 106 and/or mobile terminals 108. Each user device 210 may have its own user interface for receiving user input and/or outputting content. Alternatively or additionally, user devices 210 may use user interfaces 220 to interact with the occupants and present content. Moreover, different user devices 210 may be paired together to achieve certain functions. For example, as described above, display panel 106 may be paired with mobile terminal 108 and receive user input via paired mobile terminal 108.

User devices 210 may be configured to receive user selections of content data. User devices 210 may also be configured to access content data stored in a number of different databases and/or receive live streaming of content data from another device. The content data may embody any kinds of visual and/or audio information. For example, the content data may include video/audio calls, video/audio podcasts, TV shows, Internet videos, movies, advertisements, sports programs, navigation maps, webpages, audio books, radios, and/or music. In some embodiments, the content data may be stored in user devices 210 themselves. In some embodiments, the content data may be stored in controller 240 and accessed by user devices 210 through network 250. In some embodiments, the content data may be stored in a server of a database of a third party content provider, such as YouTube™, iTunes™, Yelp™, Facebook™, or Google Map™, and accessed by user devices 210 through network 250. In some embodiments, the content data, e.g., video calls, radios, or music, may be streamed to user devices 210 in real time through network 250.

Network 250 may be any type of wired or wireless network that may allow transmitting and receiving data. For example, network 250 may include radio waves, a nationwide cellular network, a local wireless network (e.g., Bluetooth™ or WiFi), and/or a wired network.

User interface(s) 220 may be configured to display information regarding the content presented by a first user device 210, e.g., user device 210-1, and allow a user to perform an operation for sharing the content between user device 210-1 and at least a second user device 210, e.g., user device 210-2. Consistent with the above description, user interface(s) 220 may be integrated in one or more user devices 210. For example, user interface(s) 220 may be the user interfaces provided by display panels 106 and mobile terminals 108. Alternatively or additionally, user interface(s) 220 may be devices independent from user devices 210. For example, user interface(s) 220 may be control panels 110 dedicated for controlling the sharing of content among user devices 210 and/or other functions of vehicle 100.

Sensors 230 may be configured to generate signals indicative of the identities, the seating positions, and/or the activities of the occupants in vehicle 100. For example, sensors 230 may include one or more pressure sensors 112 configured to sense the pressure applied by occupants sitting on seats 102, 104 and generate signals corresponding to the pressure. In one embodiment, pressure sensors 112 may be configured to generate signals only when the sensed pressure exceeds a preset threshold pressure that corresponds to the lower boundary of a typical weight of a non-infant human, for example, 20 lbs. In another embodiment, pressure sensors 112 may be configured to accurately measure an occupant's weight.

As another example, sensors 230 may include one or more cameras 114 configured to capture videos or images of the occupants of vehicle 100. Cameras 114 may be used in conjunction with computer vision and/or image recognition software, such that the software may distinguish a person from inanimate objects, and may recognize certain people based on physical appearances. In some embodiments, the image recognition software may include facial recognition software and may be configured to determine an identity and/or an age of occupants based on the videos or the images (e.g., by determining facial features).

Controller 240 may include, among other things, an I/O interface 242, a processing unit 244, a storage unit 246, and/or a memory module 248. These units may be configured to transfer data and send or receive instructions between or among each other. One or more of the components of controller 240 may be integrated in an on-board computer of vehicle 100, distributed among user devices 210, or in the cloud or another remote location. For example, processing unit 244 may be a processor on-board vehicle 100, a processor inside display panel 106 or mobile terminal 108, or a cloud processor. Similarly, storage unit 246 and/or memory module 248 may be configured to be a cloud storage, storage of user devices 210, and/or a database of a third party content provider, such as, Netflix™ or iTunes™. It is contemplated that processing unit 244, storage unit 246, and/or memory module 248 may consist of multiple processors or storage devices in different locations. When located away from vehicle 100, processing unit 244, storage unit 246, and/or memory module 248 may be coupled to controller 240 via network 250.

I/O interface 242 may be configured for two-way communication between controller 240 and various devices. For example, as depicted in FIG. 2, I/O interface 242 may send and receive operating signals to and from user devices 210, user interface(s) 220, and sensor(s) 230. I/O interface 242 may send and receive the data between each of the components via network 250.

I/O interface 242 may be configured to consolidate signals it receives from the various components and relay the data to processing unit 244. Processing unit 244 may include any appropriate type of general purpose or special-purpose microprocessor, digital signal processor, or microprocessor. Processing unit 244 may be configured as a separate processor module dedicated to control the sharing of content among user device 210. Alternatively, processing unit 244 may be configured as a shared processor module for performing other functions of vehicle 100 unrelated to content sharing.

Figure 3:
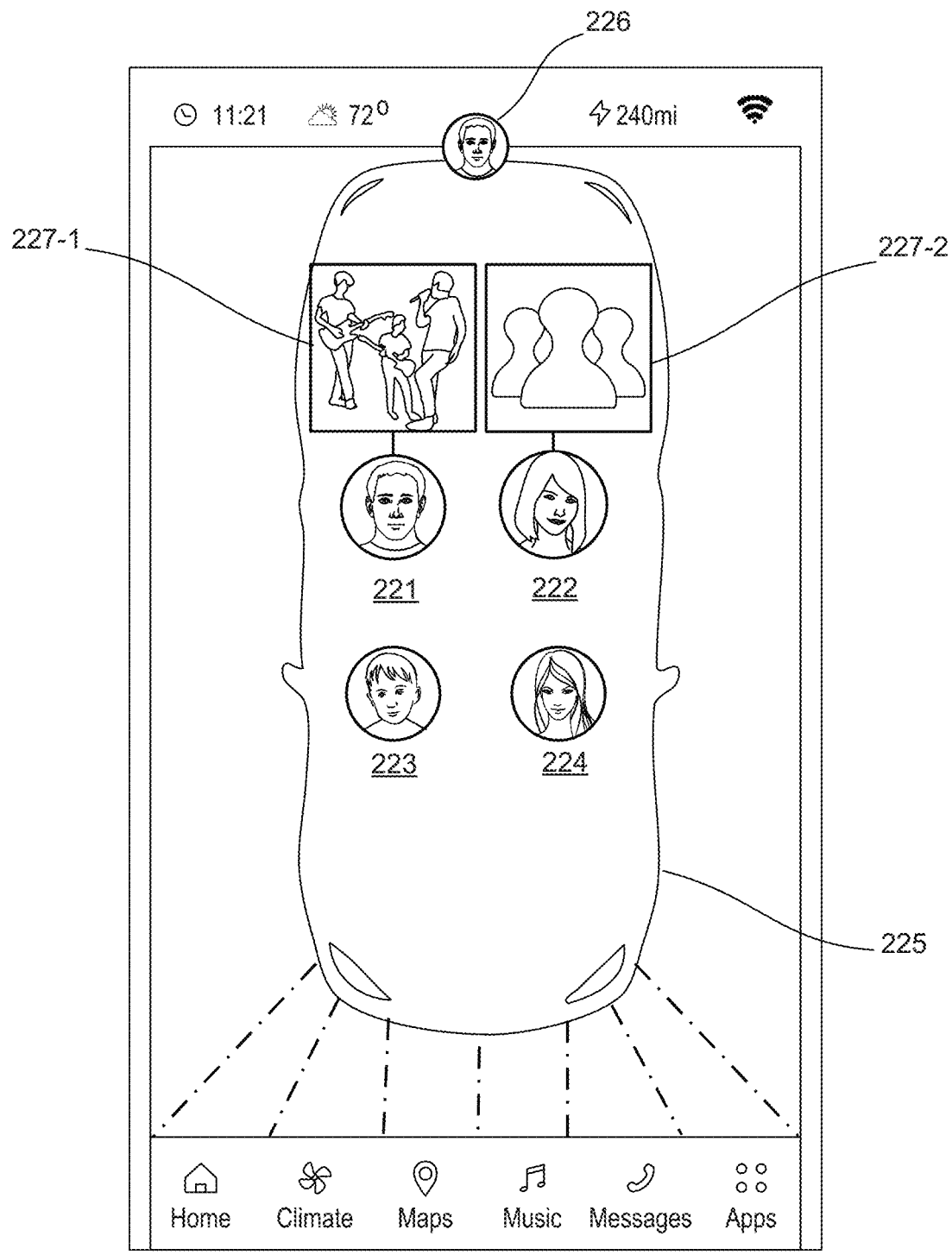
FIG. 3 is a schematic diagram illustrating an exemplary user interface provided by the in-vehicle content sharing system shown in FIG. 2.

Processing unit 244 may be configured to display on user interface 220 a map of vehicle 100. The map may show various types of information regarding user devices 210, such as the content presented by each user device 210, the identities and/or seating positions of the occupants who are using user devices 210, etc. FIG. 3 is a schematic diagram illustrating an exemplary user interface 220 for sharing content. Referring to FIG. 3, user interface 220 displays a map 225 of vehicle 100. Map 225 may show an interior layout of vehicle 100. In some embodiments, the occupants using user devices 210 may be shown on map 225 according to the seating positions of the occupants. Information regarding the occupants may be displayed on map 225. The displayed occupant information may include the identities of the occupants, represented by the occupants' names, avatars, and/or pictures. The occupant information may also indicate current activities of the occupants, such as the content currently viewed or listened to by each occupant. In the example shown in FIG. 3, user interface 220 indicates that occupants 221-224 are present in vehicle 100. Occupants 221-224 are shown according to their seating positions in vehicle 100. For example, user interface 220 shows that occupants 221 and 222 are the rear passengers, user 223 is the front passenger, and occupant 224 is the driver.

Still referring to FIG. 3, user interface 220 may indicate the content viewed or listened to by an occupant by displaying an icon 227 next to the occupant. Icon 227 may be a text, a symbol, or a picture representative of the content. In one embodiment, icons 227 may be a preview of the content. For example, user interface 220 in FIG. 3 indicates that occupant 221 is viewing a music video 227-1 and occupant 222 is participating in a video or audio conference call 227-2.

With continued reference to FIG. 3, user interface 220 may also display a user profile 226 of the user who is using user interface 220 to control the sharing of content. For example, FIG. 3 shows that the user operating user interface 220 is occupant 221.

In order to correctly identify the occupants of vehicle 100 on user interface 220, processing unit 244 may be configured to operate one or more components of system 200 to determine the identities of the occupants through a variety of mechanisms. In some embodiments, processing unit 244 may be configured to determine the presence of specific occupants based on digital signatures from user devices 210, such as mobile terminals 108, used by the occupants. The digital signatures of user devices 210 may include a determinative emitted radio frequency (RF), GPS, Bluetooth™, and/or WiFi unique identifier. Processing unit 244 may be configured to relate the digital signatures to stored data including, for example, the occupants' names, ages, preferred settings for viewing and/or listening to content, favorite content, etc.

In some embodiments, processing unit 244 may also be configured to determine the presence of the occupants by GPS tracking software used in user devices 210. In some embodiments, vehicle 100 may be configured to detect user devices 210 upon connection to local network 250 (e.g., Bluetooth™ or WiFi).

In some embodiments, processing unit 244 may also be configured to recognize occupants of vehicle 100 by receiving inputs from user devices 210. For example, user devices 210 may be configured to receive direct inputs of the identities of the occupants. User devices 210 may also be configured to receive biometric data (e.g., fingerprints) from the occupants.

In some embodiments, processing unit 244 may be further configured to determine identities of occupants by actuating cameras 114 to capture an image and process the image with facial recognition software.

In some embodiments, processing unit 244 may be configured to receive pressure information from pressure sensors 112 and determine the seating positions of the occupants based on the pressure information. Specifically, based on the pressure sensed on each seat 102, 104, processing unit 244 may be configured to compare the sensed pressure to a stored threshold pressure to determine if one or more of seats 102, 104 are occupied. For example, if the pressure sensed is less than the threshold pressure, processing unit 244 may be configured to determine that seat 102, 104 is either unoccupied or is accommodating an object without sufficient weight to constitute a non-infant person. However, if the pressure sensed is greater than the threshold pressure, processing unit 244 may determine that a non-infant person is occupying seat 102, 104.

Further, processing unit 244 may determine the identities of the occupants based on the pressure information. By comparing the measured weight with stored weight information for known occupants, processing unit 244 may determine the identity of the occupants. For example, processing unit 244 may look up a stored table listing the weight corresponding to each common occupant of vehicle 100. The stored weight table may be periodically updated to reflect the occupants' weight changes. If the measured weight matches with a particular occupant's weight within a tolerable range, e.g., ±2%, processing unit 244 may determine that the particular occupant is sitting on seat 102, 104. As such, processing unit 244 may determine the seating positions of the occupants. Processing unit 244 may periodically update the stored weight table to reflect the occupants' weight changes.

As shown by user profile 226 in FIG. 3, processing unit 244 may also need to determine who is using user interface 220 to control the content sharing. Moreover, when multiple user interfaces 220 are provided in vehicle 100, processing unit 244 may need to determine who is using which user interface 220. As described above, user interface 220 may be integrated in a user device 210, and thus processing unit 244 may determine user interface 220 is used by the same user of corresponding user device 210. Alternatively, if user interface 220 is a device independent from user devices 210, processing unit 244 may further identify the user of user interface 220 by employing methods similar to those described above for identifying the users of user devices 210. For example, user interface 220 may include a touch-sensitive surface for detecting a fingerprint of the user currently using user interface 220, and processing unit 244 may identify the user based on the fingerprint. As another example, user interface 220 may receive voice commands from a user via a microphone, and processing unit 244 may identify the user based on voice recognition. For yet another example, user interface 220 may require a user to first log into her account before using the disclosed functions related to content sharing. Thus, processing unit 244 may identify the user based on the account information provided by the user.

Figure 4:
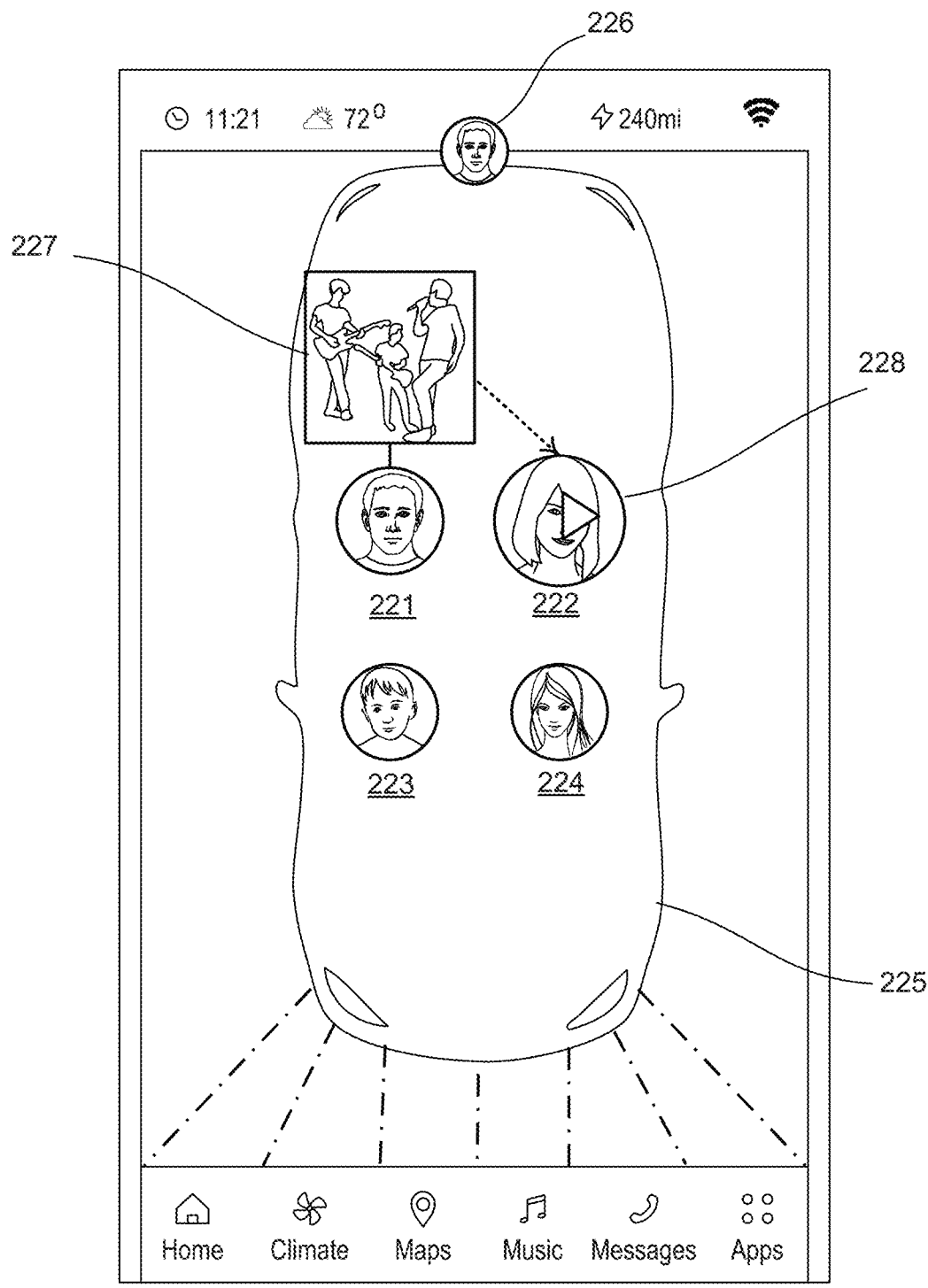
FIG. 4 is a schematic diagram illustrating an exemplary user interface provided by the in-vehicle content sharing system shown in FIG. 2.

Processing unit 244 may be configured to detect a user operation performed on user interface 220 and control the sharing of content among two or more user devices 210 based on the user operation. FIG. 4 is a schematic diagram illustrating an exemplary user interface 220 for sharing content. Referring to FIG. 4, the user operation may be in the form of dragging an icon 227 from one area of user interface 220 to another area of user interface 220. For example, user interface 220 shows, via user profile 226, that user interface 220 is currently operated by occupant 221. Meanwhile, user interface 220 shows, via icon 227 next to occupant 221, that occupant 221 is viewing a music video on a user device 210, e.g., user device 210-1. When occupant 221 wants to share the music video with occupant 222, occupant 221 may drag icon 227 from occupant 221 to occupant 222, and drop icon 227 in an area corresponding to occupant 222, such as on top of the picture of occupant 222.

Still referring to FIG. 4, after being dropped on occupant 222, icon 227 may reshape into a play icon 228. If occupant 222 subsequently presses play icon 228, processing unit 244 may automatically control user device 210 used by occupant 222, e.g., user device 210-2, to play the music video represented by icon 227. Alternatively, processing unit 244 may send an inquiry to user device 210-2, requesting occupant 222 to confirm whether it is permitted to play the music video. Occupant 222 may instruct user device 210-2 to play the music video immediately or after a delayed time, or may reject the music video. Device 210-2 may obtain and play the music video in various ways. For example, if user device 210-1 stores the music video data, processing unit 244 may instruct user device 210-1 to stream the music video data to user device 210-2. As another example, if the music video data is stored in controller 240, e.g., storage unit 246 and/or memory module 248, processing unit 244 may send the music video data directly from controller 240 to user device 210-2.

Although the above description uses the music video as an example, the disclosed systems and methods may be used to share any types of content among two or more user devices 220. The shared content may include but are not limited to screen data, audio data, video/audio calls, video/audio podcasts, video/audio podcasts, radios, music, TV shows, sports programs, movies, webpages, map data including map locations, map routes, and/or waypoints of vehicle 100, etc. For example, occupant 221 may use user device 210-1 to conduct a video conference. Accordingly, user interface 220 may display an icon 227 representing the video conference. Occupant 221 may invite occupant 222 to the video conference by dragging icon 227 and dropping on occupant 222. This way, occupant 222 may conveniently join the video conference through user device 210-2.

Figure 5:
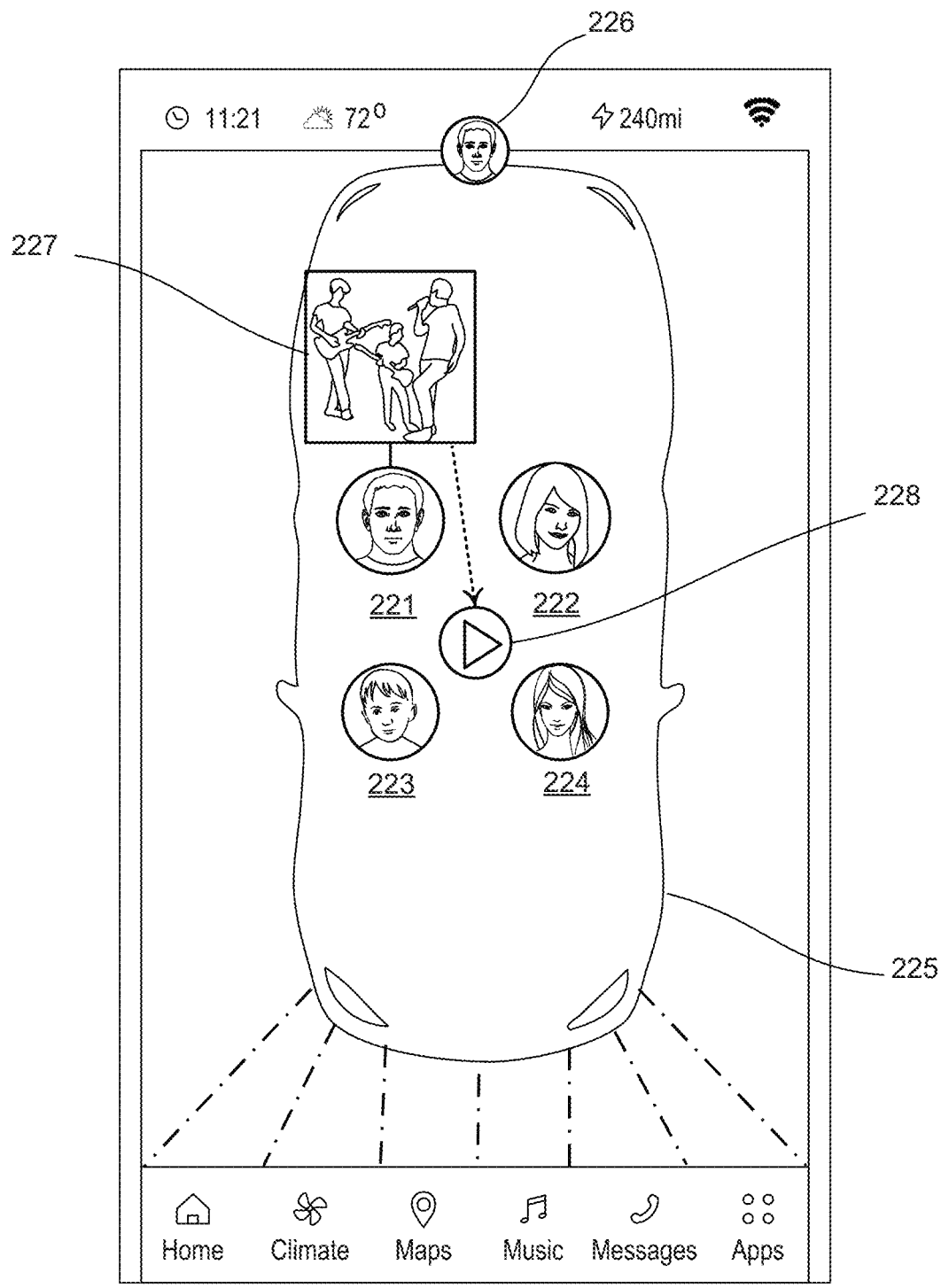
FIG. 5 is a schematic diagram illustrating an exemplary user interface provided by the in-vehicle content sharing system shown in FIG. 2.

In some embodiments, user interface 220 may be configured to allow a user to share the same content among all user devices 210 by moving icon 227 to a predefined area of user interface 220. FIG. 5 is a schematic diagram illustrating an exemplary user interface 220 for sharing content. As shown in FIG. 5, user interface 220 shows occupant 221 is viewing a music video. When occupant 221 drags icon 227 representing the music video to a central area of user interface 220, processing unit 244 may conclude that occupant 221 wants to share the music video among all the occupants, i.e. all user devices 210, of vehicle 100. For example, after being dragged to the central area, icon 227 may reshape to play icon 228. When occupant 221 presses play icon 228, processing unit 244 may instruct user devices 220 used by occupants 222-224, e.g., user devices 210-2, 210-3, and 210-4, to play the same music video. In some embodiments, processing unit 244 may limit the sharing of the content among the currently activated user devices 210. For example, some occupants may be taking a nap and have turned off user devices 210 associated with them. In these situations, even if processing unit 244 detects that icon 227 is dragged to the central area, processing unit 244 may not activate those originally deactivated user devices 210, so as not to interrupt occupants who do not want to receive content from another occupant.

In some embodiments, processing unit 244 may control the sharing of content based on the identities, ages, preferences, and/or seating positions of the occupants, in addition to the user operations performed on user interface 220. In one embodiment, processing unit 244 may be configured to prevent videos from being displayed to the driver of vehicle 100, permanently or when vehicle 100 is running, so as not to distract the driver. For example, referring to FIG. 5, processing unit 244 may restrict display panel 106 and/or mobile terminal 108 located at the driver's seat to play the music video to the driver, i.e., occupant 224, despite detecting that icon 227 is dragged to the central area.

In some embodiments, processing unit 244 may be configured to restrict certain content being shared to an occupant based on the age of the occupant. For example, children often sit on back seats 104. When processing unit 244 determines that a rear passenger is under age 13, processing unit 244 may prevent any content containing violence being shared to user device(s) 210 associated with the underage passenger.

Figure 6:
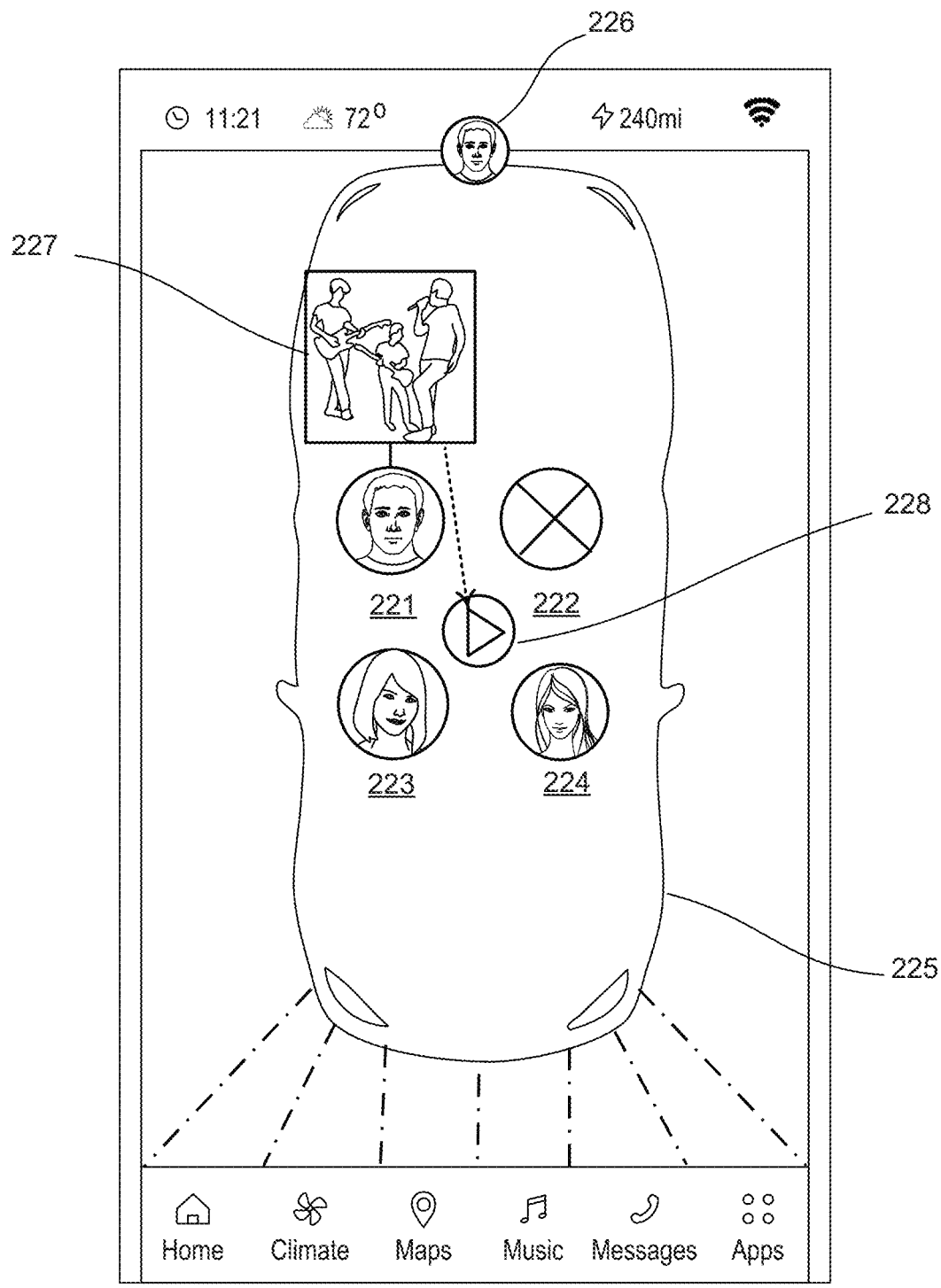
FIG. 6 is a schematic diagram illustrating an exemplary user interface provided by the in-vehicle content sharing system shown in FIG. 2.

In some embodiments, processing unit 244 may be configured to restrict all or certain content being shared to an occupant based on preset user preferences. FIG. 6 is a schematic diagram illustrating an exemplary user interface 220 for sharing content. Referring to FIG. 6, occupant 222 may be a baby. Before a trip starts, the baby's parent, e.g., occupant 221, may operate user interface 220 to disable the content sharing function of user device(s) 210 associated with baby 222. This way, even if occupant 221 drags icon 227 to the central area of user interface 220, the content represented by icon 227 will only be shared with occupants 223 and 224, but not baby occupant 222. User interface 220 may be configured to allow the parent to disable the content sharing function of user devices 210 associated with baby 222 for the entire trip or for a preset time period, e.g., 2 pm-4 pm.

In some embodiments, processing unit 244 may be configured to differentiate user authorities in connection with sharing content. In one embodiment, processing unit 244 may be configured to only execute content sharing commands issued by users with administrator rights. In another embodiment, processing unit 244 may be configured to restrict which occupant can provide or "push" the content presented by her user device 210 to another occupant's user device 210. For example, the driver of vehicle 100 may instruct, via user interface 220, system 200 to only allow her family members to "push" content to other occupants. Accordingly, when processing unit 244 determines that a non-family member attempts to operate user interface 220 to provide content to other occupants, processing unit 244 may refuse to share the content presented by the non-family member's user device 210 to other user devices 210. In yet another embodiment, processing unit 244 may be configured to restrict which occupant can request or "pull" the content from another occupant's user device 210. For example, the driver of vehicle 100 may instruct system 200 to forbid children from "pulling" content from other occupants. Accordingly, when processing unit 244 detects that a child passenger attempts to request content from another occupant's user device 210, processing unit 244 may refuse to share the requested content with the child passenger's user device 210.

Figure 7:
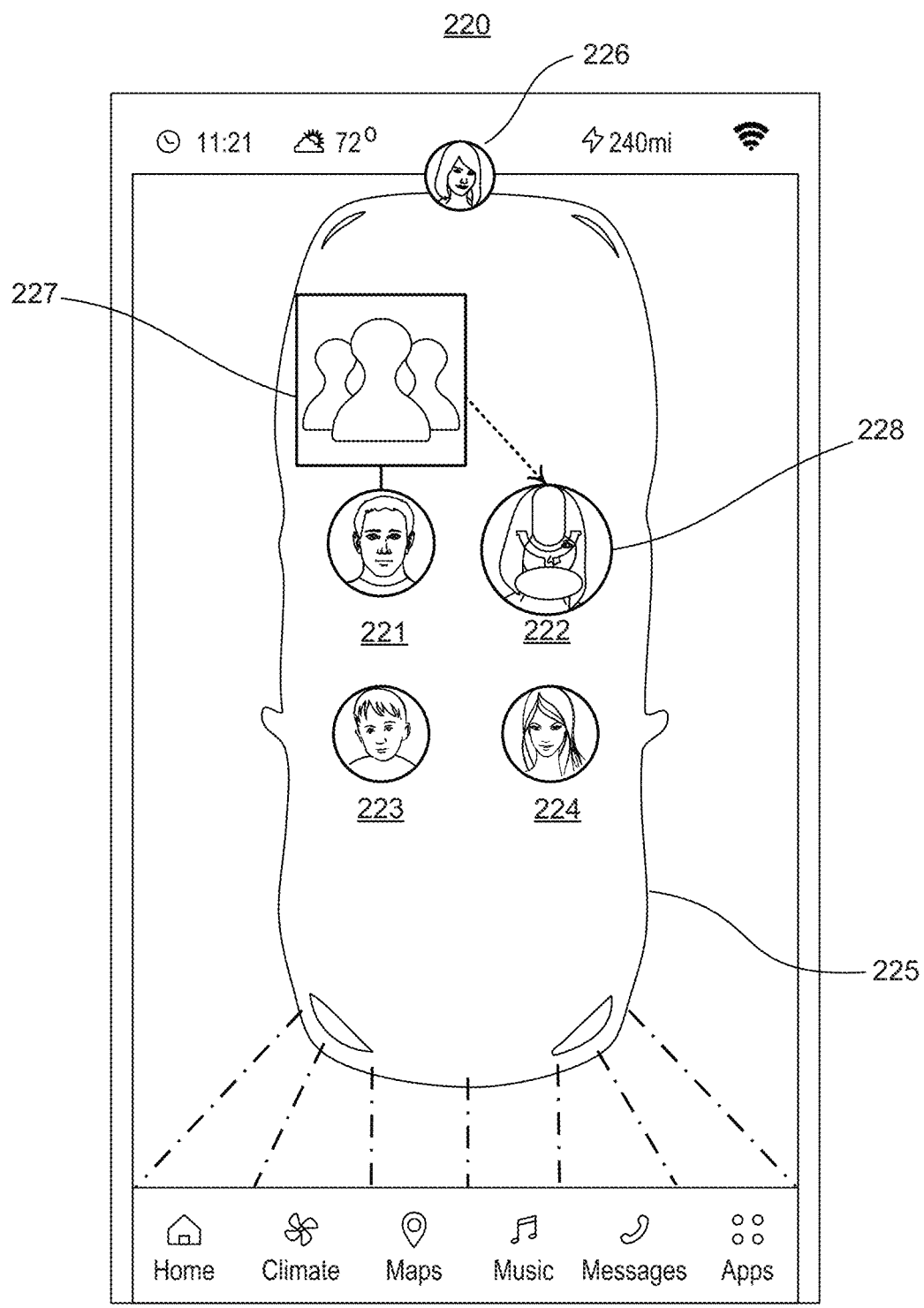
FIG. 7 is a schematic diagram illustrating an exemplary user interface provided by the in-vehicle content sharing system shown in FIG. 2.

In some embodiments, processing unit 244 may be configured to first request permission from a user device 210 before content is drawn from or provided to the user device 210, and share the content when the permission is granted. FIG. 7 is a schematic diagram illustrating an exemplary user interface 220 for sharing content. In FIG. 7, user interface 220 shows, via user profile 226, that user interface 220 is currently operated by occupant 222. Meanwhile, user interface 220 shows, via icon 227 next to occupant 221, that occupant 221 is using a user device 210, e.g., user device 210-1, to host a video or audio conference call. When occupant 222 wants to join the conference call via her user device 210, e.g., user device 210-2, occupant 222 may drag icon 227 from occupant 221 to occupant 222, and drop icon 227 in an area corresponding to occupant 222, such as on top of the picture of occupant 222. Icon 227 may then reshape into a phone icon 228. When occupant touches phone icon 228, processing unit 244 may send an inquiry to user device 210-1, requesting permission for connecting user device 210-2 to the conference call. The inquiry may be displayed as a pop-up message on a screen of user device 210-1. If occupant 221 instructs user device 210-1 to grant the permission, processing unit 244 may connect user device 210-2 to the teleconference call and control user device 210-1 to stream the video or audio call data to user device 210-2. If occupant 221 does not grant the permission, processing unit 244 may inform occupant 222 via user device 210-2 that the connection has failed.

In some embodiments, processing unit 244 may also be configured to selectively display the information regarding the content presented by each user device 210 (i.e., content viewed or listened to by each occupant). In particular, processing unit 244 may be configured to restrict an occupant from seeing information regarding other occupant's activities in connection with consuming content. For example, processing unit 244 may be configured to allow the driver of vehicle 100 to view, in the driver's user interface 220, information regarding the content viewed or listened to by all the passengers. Processing unit 244 may also be configured to restrict a child passenger's user interface 220 from showing what content are consumed by other occupants.

In some embodiments, processing unit 244 may also be configured to control other features of vehicle 100 according to the sharing of content. For example, the audio system of vehicle 100 may include multiple stereo speakers installed in various locations of vehicle 100. Processing unit 244 may activate one or more of the stereo speakers based on which occupants are sharing the content. Referring to the example shown in FIG. 4, when occupant 221 shares the music video with occupant 222, processing unit 244 may automatically activate the stereo speaker on the side of occupant 222.

Storage unit 246 and memory module 248 may include any appropriate type of mass storage provided to store any type of information that processing unit 244 may need to operate. For example, storage unit 246 may include one or more hard disk devices, optical disk devices, or other storage devices to provide storage space. Memory module 248 may include one or more memory devices including, but not limited to, a ROM, a flash memory, a dynamic RAM, and a static RAM.

Storage unit 246 and/or memory module 248 may be configured to store one or more computer programs that may be executed by controller 240 to perform functions of in-vehicle content sharing system 200. For example, storage unit 246 and/or memory module 248 may be configured to store software used by processing unit 244 to perform the above described content sharing functions, such as displaying on user interface 220 the information regarding the occupants and their associated user devices 210, detecting one or more user operations performed on user interface 220, and controlling the sharing of the content among user devices 210 based on the user operations. Storage unit 246 and/or memory module 248 may be also configured to store information used by processing unit 244. For example, storage unit 246 may be configured to store data for individual profiles of common occupants (e.g., account user names and passwords, preferring settings for content sharing).

Figure 8:
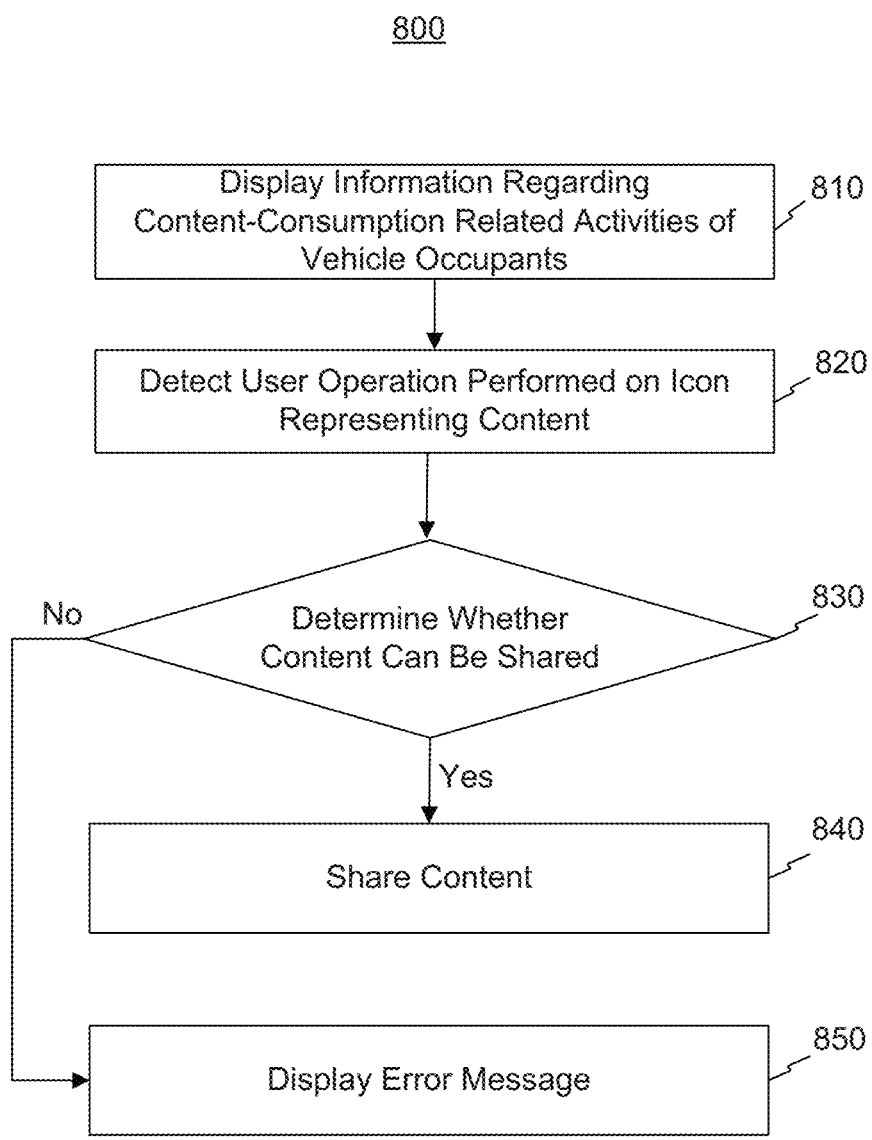
FIG. 8 is a flowchart of an exemplary content sharing method performed by the in-vehicle content sharing system shown in FIG. 2.

FIG. 8 is a flowchart of an exemplary content sharing method 800. For example, method 800 may be performed by in-vehicle content sharing system 200 to control the sharing of content among multiple user devices 210. In particular, system 200 may employ a user interface 220 to display the content presented by user devices 210, i.e. the activities of the occupants of vehicle 100 in connection with consuming content. A user may seamlessly control the sharing of certain content by moving an icon representing the content from one area of user interface 220 to another area of user interface 220. Based on the user operation as well as other settings, system 200 may automatically determine whether the content is permitted to be shared and, if permitted, share the content. Operation of exemplary in-vehicle content sharing system 200 will now be described with respect to FIG. 8.

In step 810, controller 240 may display, via user interface 220, information regarding content-consumption related activities of the occupants present in vehicle 100. User interface 220 is used by an occupant of vehicle 100 to share the content played by a first user device 210-1 with at least a second user device 210-2. User interface 220 may be communicatively connected to controller 240 and controlled by controller 240 to perform functions consistent with the disclosed embodiments. User interface 220 may display a map of vehicle 100. In one embodiment, user interface 220 may show the occupants on the map according to the occupants' seating positions. User interface 220 may also show on the map the identities of each occupant, in the form of the occupants' names, avatars, and/or pictures. User interface 220 may show the occupants' content-consumption related activities by indicating the content currently played by each user device 210 used by the occupants. For example, the content played by user device 210-1 may be represented by an icon in the form of a text, a symbol, or a preview of the content.

In step 820, controller 240 may detect, via user interface 220, a user operation performed on the icon representing the content played by user device 210-1. The user operation may be in the form of moving the icon from an area of user interface 220 to another area of user interface 220. For example, when detecting the icon is moved from an area corresponding to user device 210-1 to an area corresponding to user device 210-2, controller 240 may conclude that the user of user interface 220 wants to share the content presented by user device 210-1 with user device 210-2. As another example, when detecting the icon is moved from the area corresponding to user device 210-1 to a predefined area, such as a central area of user interface 220, controller 240 may conclude that the user of user interface 220 wants to share the content played by user device 210-1 with all the other user devices 210.

In step 830, controller 240 may determine whether user device 210-1 can share the content with user device 210-2, according to various user settings. For example, controller 240 may prevent any video content to be shared to user device 210-2 if user device 210-2 is used by the driver of vehicle 100. As another example, controller 240 may restrict certain content to be shared with user device 210-2 if the user of user device 210-2 is below a predetermined age.

In one embodiment, when determining that the user operation is performed by the user of user device 210-1, controller 240 may further determine whether user device 210-1 is permitted to provide the content to user device 210-2. For example, controller 240 may check whether the user of user device 210-1 has authority to "push" content to another occupant. If it is determined that user device 210-1 is permitted, controller 240 may conclude that the content can be provided to user device 210-2. Otherwise, controller 240 may conclude that the content should be restricted from being provided to user device 210-2.

Similarly, when determining that the user operation is performed by the user of user device 210-2, controller 240 may further determine whether user device 210-2 is permitted to request the content from user device 210-1. For example, controller 240 may check whether the user of user device 210-2 has authority to "pull" content from another occupant. If it is determined that user device 210-2 is permitted, controller 240 may conclude that the content can be provided to user device 210-2. Otherwise, controller 240 may conclude that the content should not be provided to user device 210-2.

In step 840, when it is determined that user device 210-1 can share the content with user device 210-2, controller 240 may control user device 210-1 to share the content with user device 210-2. In some embodiments, when the user operation is performed by the user of user device 210-1 to "push" content to user device 210-2, controller 240 may first send an inquiry to user device 210-2, requesting permission for providing the content to user device 210-2. If user device 210-2 grants the permission, user device 210-1 may provide the content to user device 210-2. Otherwise, user device 210-1 does not provide the content to user device 210-2. Similarly, when the user operation is performed by the user of user device 210-2 to "pull" content from user device 210-1, controller 240 may first send an inquiry to user device 210-1, requesting permission for obtaining the content from user device 210-1. Controller 240 may provide the content to user device 210-2 only if user device 210-1 grants the permission.

In step 850, when it is determined that user device 210-1 cannot share the content with user device 210-2, controller 240 may display, via user interface 220, an error message indicating the sharing is not permitted or has failed.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

As described above, the application of the disclosed system and method is not limited to a vehicle or any particular form/type of content. For example, the disclosed system may be implemented as an in-home content sharing system for sharing multimedia information, e.g., photos, videos, music, webpages, computer games, among family members. As another example, the disclosed system may be implemented as an in-office content sharing system for sharing work-related documents among corporate employees. For yet another example, the disclosed system may be configured as a meeting tool for sharing meeting materials, e.g., presentations, graphs, and text documents, among the meeting participants.

It will be apparent to those skilled in the art that various modifications and variations can be made to the disclosed content sharing system and related methods. Other embodiments will be apparent to those skilled in the art from consideration of the specification and practice of the disclosed content sharing system and related methods. It is intended that the specification and examples be considered as exemplary only, with a true scope being indicated by the following claims and their equivalents.

What is claimed is:

1. A content sharing system for use in a vehicle, comprising:
a user interface configured to allow disabling content sharing of at least one user device for a preset time period; and
a controller coupled with the user interface, the controller being configured to:
display a map of the vehicle on the user interface, the map showing at least:
a plurality of occupant icons each representing an occupant in the vehicle and a corresponding user device, wherein a location of each of the occupant icons on the map corresponds to where a corresponding occupant is in the vehicle, and a first content icon representing content presented by a first user device of a first occupant, the first occupant represented by a first occupant icon of the plurality of the occupant icons;

allow sharing of content between user devices corresponding to the plurality of occupant icons in response to a user dragging a particular content icon to a particular occupant icon within the user interface;

detect a user operation dragging the first content icon to a central area of the user interface;

determine one or more other user devices of the plurality of occupants represented by corresponding occupant icons to be currently activated;

control, based on the user operation, sharing of the content presented by the first user device between the first user device of the first occupant and only those one or more other user devices of the plurality of occupants determined to be currently activated including a second user device, wherein the content is shared between the first user device of the first occupant and all other corresponding user devices of the plurality of occupants when all other corresponding user devices of the plurality of occupants are determined to be currently activated;

allow the plurality of occupants to push content presented by their corresponding user device to another occupant's user device while restricting a first at least one of the plurality of occupants from pushing content to another occupant's user device based on an identity of the first at least one of the plurality of occupants;

allow the plurality of occupants to pull content from another occupant's user device while restricting a second at least one of the plurality of occupants from pulling content from another occupant's user device based on an identity of the second at least one of the plurality of occupants;

allow a driver of the vehicle to view, in a driver's user interface, information regarding what content is being viewed by all passengers of the vehicle; and restrict a user device of a first passenger of the vehicle from showing information regarding what content is being consumed by a second passenger of the vehicle based on an identity of the first passenger.

2. The system of claim 1, wherein the user operation includes dragging the content icon from a first area of the map to the central area of the user interface; and wherein the content icon is reshaped once moved to be activated to play the content.

3. The system of claim 1, wherein the controller is further configured to:
identify the occupants of the vehicle who use the plurality of user devices; and control the sharing of the content based additionally on at least one of identities, ages, preferences, or seating positions of the occupants.

4. The system of claim 3, wherein the controller is further configured to: restrict a user device used by a driver of the vehicle from playing a predefined type of content.

5. The system of claim 1, wherein the controller is further configured to:
determine that the content relates to a conference call hosted by the first user device;
request permission from the first user device for allowing the second user device to join the conference call; and
when the first user device grants the permission, provide the content to the second user device.

6. The system of claim 1, wherein the user operation is performed by the first occupant; and wherein the controller is further configured to:
determine whether the first user device is permitted to provide the content to the second user device;
if the first user device is permitted, provide the content to the second user device; and
if the first user device is not permitted, restrict the content from being shared with the second user device.

7. The system of claim 1, wherein the user operation is performed by a user of the second user device; and wherein the controller is further configured to:
determine whether the second user device is permitted to share the content presented by the first user device;
if the second user device is permitted, provide the content to the second user device; and
if the second user device is not permitted, restrict the content from being shared with the second user device.

8. The system of claim 1, wherein the controller is further configured to: display, on the map, information regarding the occupants of the vehicle who use the plurality of user devices.

9. The system of claim 8, wherein the occupant information includes at least one of names of the occupants, avatars representing the occupants, pictures of the occupants, activities of the occupants, or seating positions of the occupants in the vehicle.

10. The system of claim 3, wherein the controller is further configured to: restrict, based on an identity of an occupant in the vehicle, the sharing of the content from the user interface to a user device of the occupant.

11. The system of claim 1, wherein the content includes at least one of screen data, audio data, video calls, audio calls, podcasts, radios, music, TV shows, sports programs, movies, map locations, map routes, or waypoints.

12. The system of claim 1, wherein the controller is further configured to: control an audio system of the vehicle based on the sharing of the content.

13. The system of claim 1, wherein the user interface is part of a mobile device.

14. The system of claim 1, wherein the controller is in a cloud in communication with the vehicle.

15. A content sharing method for use in a vehicle, the method comprising:
allowing, by a user interface of the vehicle, disabling content sharing of at least one user device for a preset time period;
displaying a map of the vehicle on the user interface, the map showing at least:
a plurality of occupant icons each representing an occupant in the vehicle and a corresponding user device, wherein a location of each of the occupant icons on the map corresponds to where a corresponding occupant is in the vehicle, and
a first content icon representing content presented by a first user device of a first occupant, the first occupant represented by a first occupant icon of the plurality of the occupant icons;
allowing sharing of content between user devices corresponding to the plurality of occupant icons in response to a user dragging a particular content icon to a particular occupant icon within the user interface;
detecting a user operation dragging the first content icon to a central area of the user interface;
determining one or more other user devices of the plurality of occupants represented by corresponding occupant icons to be currently activated;

controlling, based on the user operation, sharing of the content presented by the first user device between the first user device of the first occupant and only those one or more other user devices of the plurality of occupants determined to be currently activated including a second user device, wherein the content is shared between the first user device of the first occupant and all other corresponding user devices of the plurality of occupants when all other corresponding user devices of the plurality of occupants are determined to be currently activated;

allowing the plurality of occupants to push content presented by their corresponding user device to another occupant's user device while restricting a first at least one of the plurality of occupants from pushing content to another occupant's user device based on an identity of the first at least one of the plurality of occupants;

allowing the plurality of occupants to pull content from another occupant's user device while restricting a second at least one of the plurality of occupants from pulling content from another occupant's user device based on an identity of the second at least one of the plurality of occupants;

allowing a driver of the vehicle to view, in a driver's user interface, information regarding what content is being viewed by all passengers of the vehicle; and restricting a user device of a first passenger of the vehicle from showing information regarding what content is being consumed by a second passenger of the vehicle based on an identity of the first passenger.

16. The method of claim 15, wherein the user operation includes dragging the content icon from a first area of the map to the central area of the user interface; and wherein the content icon is reshaped once moved to be activated to play the content.

17. The method of claim 15, further comprising: identifying the occupants of the vehicle who use the plurality of user devices; and controlling the sharing of the content based additionally on at least one of identities, ages, preferences, or seating positions of the occupants.

18. A non-transitory computer-readable medium storing instructions which, when executed, cause one or more processors to perform a content sharing method for use in a vehicle, the method comprising:

allowing, by a user interface of the vehicle, disabling content sharing of at least one user device for a preset time period;

displaying a map of the vehicle on the user interface, the map showing at least:

a plurality of occupant icons each representing an occupant in the vehicle and a corresponding user device, wherein a location of each of the occupant icons on the map corresponds to where a corresponding occupant is in the vehicle, and a first content icon representing content presented by a first user device of a first occupant, the first occupant represented by a first occupant icon of the plurality of the occupant icons;

allowing sharing of content between user devices corresponding to the plurality of occupant icons in response to a user dragging a particular content icon to a particular occupant icon within the user interface;

detecting a user operation dragging the first content icon to a central area of the user interface;

determining one or more other user devices of the plurality of occupants represented by corresponding occupant icons to be currently activated;

controlling, based on the user operation, sharing of the content presented by the first user device between the first user device of the first occupant and only those one or more other user devices of the plurality of occupants determined to be currently activated including a second user device, wherein the content is shared between the first user device of the first occupant and all other corresponding user devices of the plurality of occupants when all other corresponding user devices of the plurality of occupants are determined to be currently activated;

allowing the plurality of occupants to push content presented by their corresponding user device to another occupant's user device while restricting a first at least one of the plurality of occupants from pushing content to another occupant's user device based on an identity of the first at least one of the plurality of occupants;

allowing the plurality of occupants to pull content from another occupant's user device while restricting a second at least one of the plurality of occupants from pulling content from another occupant's user device based on an identity of the second at least one of the plurality of occupants;

allowing a driver of the vehicle to view, in a driver's user interface, information regarding what content is being viewed by all passengers of the vehicle; and restricting a user device of a first passenger of the vehicle from showing information regarding what content is being consumed by a second passenger of the vehicle based on an identity of the first passenger.

* * * * *